Figure 1:
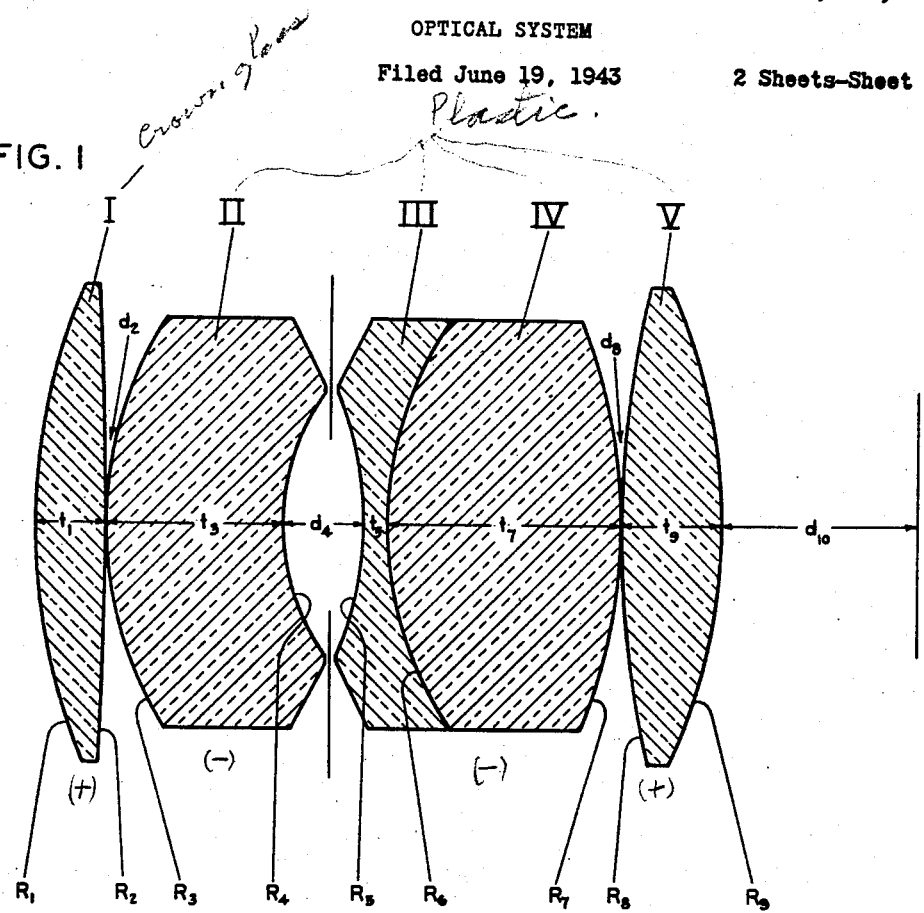

Sept. 3, 1946.  D. S. GREY  2,406,762
OPTICAL SYSTEM
Filed June 19, 1943  2 Sheets-Sheet 1

| f/4.5 | | f.l. - 190 | | |
|---|---|---|---|---|
| LENS | RADIUS | THICKNESS | $N_D$ | V |
| I | $R_1 = +120.1$ | $t_1 = 13.8$ | 1.523 | 57 |
|   | $R_2 = -1848.5$ | $d_2 = 0$ | | |
| II | $R_3 = +75.2$ | $t_3 = 35.0$ | 1.506 | 57 |
|   | $R_4 = +44.7$ | $d_4 = 15.8$ | | |
| III | $R_5 = -67.3$ | $t_5 = 4.5$ | 1.592 | 31 |
|   | $R_6 = +71.1$ | | | |
| IV | $R_6 = +71.1$ | $t_7 = 46.2$ | 1.506 | 57 |
|   | $R_7 = -107.4$ | $d_8 = 0$ | | |
| V | $R_8 = +218.8$ | $t_9 = 19.2$ | 1.506 | 57 |
|   | $R_9 = -114.0$ | $d_{10} = 140.7$ | | |

David S. Grey
INVENTOR.

BY Donald L. Brown
Attorney

Sept. 3, 1946.  D. S. GREY  2,406,762
OPTICAL SYSTEM
Filed June 19, 1943  2 Sheets-Sheet 2

| f/3 | | | f.l.= 100 | |
|---|---|---|---|---|
| LENS | RADIUS | THICKNESS | $N_D$ | V |
| $I_A$ | $R_1 = +48.24$ | $t_1 =$ 7.6 | 1.611 | 58.8 |
| | $R_2 = +452.49$ | $d_2 =$ 0 | | |
| $II_A$ | $R_3 = +33.55$ | $t_3 =$ 14.8 | 1.506 | 57 |
| | $R_4 = -153.84$ | | | |
| $III_A$ | $R_4 = -153.84$ | $t_4 =$ 1.8 | 1.591 | 31 |
| | $R_5 = +27.85$ | $d_5 =$ 4.6 | | |
| $IV_A$ | $R_6 = -66.22$ | $t_6 =$ 1.8 | 1.506 | 57 |
| | $R_7 = +46.30$ | $d_7 =$ 6.95 | | |
| $V_A$ | $R_8 = -169.49$ | $t_8 =$ 5.0 | 1.506 | 57 |
| | $R_9 = -106.38$ | $d_9 =$ 0 | | |
| $VI_A$ | $R_{10} = +88.88$ | $t_{10} =$ 6.0 | 1.506 | 57 |
| | $R_{11} = -74.07$ | $d_{11} =$ 66.1 | | |

David S. Grey
INVENTOR.

BY Donald L. Brown
Attorney

Patented Sept. 3, 1946

2,406,762

UNITED STATES PATENT OFFICE 2,406,762

OPTICAL SYSTEM

David S. Grey, Cambridge, Mass., assignor to Polaroid Corporation, Cambridge, Mass., a corporation of Delaware Application June 19, 1943, Serial No. 491,493

14 Claims. (Cl. 88—57)

This invention relates to optical systems and more particularly to athermalization of optical systems comprising one or more lens elements of organic resin or plastic.

In an optical system comprising one or more lens elements formed from an organic resin or plastic, changes in temperature produce variations in the index of refraction, curvature, and thickness of each plastic lens and thereby change the position of the focal surface of the system. It is inconvenient and frequently impractical to re-focus the lens system to correct for these thermal effects, and accordingly, it is one object of the present invention to provide a novel optical system comprising one or more plastic lenses, the lenses of said system being selected and arranged in a novel manner so that there is no appreciable variation in focal point due to changes in temperature.

Another object is to provide a novel arrangement of, and a novel method of arranging lens elements in an optical system wherein all but the first are formed from an organic resin and the first is of glass and athermalizes the entire system for focal point.

A further object is to provide a novel athermalized system of lens elements wherein a plurality of lenses subject to appreciable temperature effects are athermalized for focal point to a predetermined extent by one or more lens elements of a material negligibly affected by changes in temperature, as for example one of the optical glasses.

Still another object is to provide a novel optical system comprising one or more glass lens elements and a plurality of plastic lens elements wherein athermalization of the plastic elements is achieved to a desired extent by the glass element or elements in a manner analogous to the achromatization of a lens system for focal point.

The above and other objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

Figure 2:
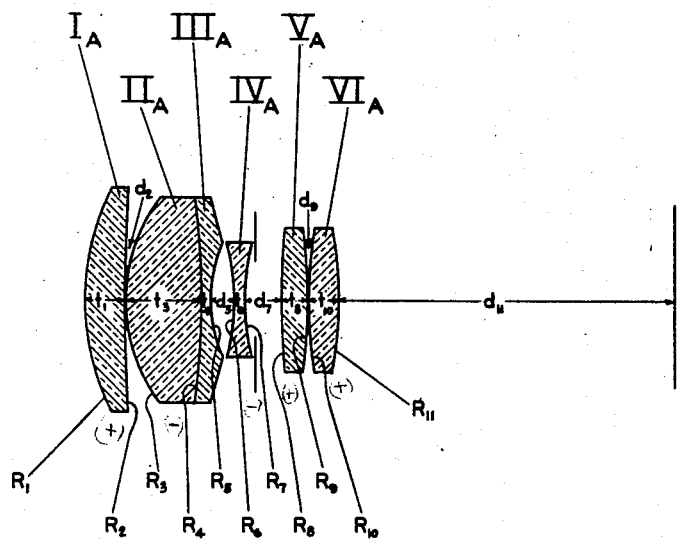

In the drawings:

Figure 1 is a sectional view of a lens system embodying one form of the invention wherein a plurality of plastic lenses are partially athermalized to a predetermined extent for focal point by one glass lens; and Fig. 2 is a similar view of another lens system wherein a plurality of plastic lenses are substantially completely athermalized for focal point by a glass lens.

In accordance with the present invention, a system of lens elements, such as a photographic objective, wherein a plurality of the elements are formed of plastic, may be athermalized for focal point by providing the system with one or more glass lens elements. To accomplish this an equation similar to the achromatization equation for the focal point is utilized in the lens computation and an infinite nu value is assigned to the glass lens or lenses and a convenient finite nu value, for example 100, to the plastic lenses in said equation. The athermalization is thus achieved with the glass serving as the "thermal crown" and the plastic as the "thermal flint." Such an equation thus involves an expression for thermal nu value, instead of color nu value or dispersion as in the case of achromatization. Specifically, the thermal nu value for a material may be determined from the reciprocal of the quantity $$\left(\frac{\frac{dn}{dT}}{n-1} - C_T\right)$$

wherein $n$ is the index of refraction of the material, $C_T$ is the coefficient of linear expansion of the material and $$\frac{dn}{dT}$$

is the rate of change of the index of refraction of the material with change in temperature, it being noted that the factors involved are properties inherent to a material. As will presently appear, the plastics or "thermal flint" materials described herein have similar coefficients of linear expansion as well as similar rates of change in index per degree centigrade and hence will have similar thermal nu values. This athermalization is approximated if the glass lens elements are constructed so that the sum of the "convergence factors" of said elements is equal to approximately the power of the lens system, i. e., if the sum of the convergence factors of the plastic lenses is equal to approximately zero. The convergence factor is the product obtained when the power of each of said glass elements is multiplied by a position factor $(1-C)^2$, $C$ being the fractional convergence of the paraxial ray on reaching said element. If the above condition is satisfied, athermalization for focal point is approximately obtained regardless of the number of glass lenses in the system and regardless of the location of said lenses relative to the plastic elements of the system.

It will be appreciated that when only a single lens element of glass is employed the power of that element multiplied by the position factor for that element should be approximately equal to the power of the entire system.

It is preferable in optical systems, because of the lesser expense, to utilize as many elements of plastic as possible, and accordingly, it is preferable wherever possible to athermalize a lens system comprising plastic elements for focal point by a single lens element of glass. It is also desirable, because of the greater hardness of the glass as compared to the plastic, to use the glass element as the outside or first lens of the system so that said glass element serves as a protection for the remaining elements of the system. With this arrangement of lenses in a given optical system, i. e., a first glass lens and remaining lenses of plastic, it is possible, according to the present invention, to athermalize the system by selecting the glass element so that the focal length thereof is approximately the same as that of the total lens system.

The athermalization obtained in the above manner, i. e., by having the sum of the convergence factors of the athermalization lenses equal to the power of the system, approximates a complete or 100% athermalization for focal point for the plastic lenses. The thermal effect on the other lenses in the system, i. e., the athermalization lenses, is negligible, and accordingly, there is obtained substantially 100% athermalization for the entire system.

It may be desirable, however, to obtain some lesser or greater percentage of athermalization by means of the athermalization lenses because there may be a partial compensation for, or a greater variation in, temperature effect on focal point due to other causes than the thermal effects on the lenses of high thermal coefficient. For example, the linear expansion or contraction with temperature of the housing for the lens system may partially athermalize for focal point. Accordingly, to obtain a substantially complete over-all athermalization for the lens system, it may be necessary to obtain, by means of the athermalization lenses, an athermalization which differs from 100%. In this connection it has been determined that the percentage athermalization obtained by the athermalizing lenses is in direct proportion to the ratio of the sum of the convergence factors of the athermalizing lenses to the power of the optical system. As a result, when thermal effects, for example, on the housing of a lens system cause a partial athermalization or correction of N% for the change in focal surface with temperature, the athermalizing lens elements may be arranged and computed so that the sum of the convergence factors thereof is such that the ratio of said sum to the power of the system is equal to $$\left(\frac{100-N}{100}\right)$$

times the power of the system. Thus, the amount of athermalization obtained optically, i. e., by means of lenses having substantially zero coefficient of thermal expansion and having their optical properties affected negligibly by changes in temperature, is (100−N)% and the system is thus completely athermalized for focal point.

Referring to the drawings, there is shown in Fig. 1 a photographic objective comprising a plurality of plastic lens elements and athermalized in accordance with the present invention. In the form shown, said objective comprises five lens components, I, II, III, IV, and V, wherein foremost lens component I is the athermalization lens and is formed preferably of crown glass, such as Crown 1. The remaining lens elements of the system are formed preferably of two suitable organic resins or plastics which have the necessary differences in indices of refraction and nu values to constitute flint and crown materials for the system. A satisfactory resin for the crown material is cyclohexyl methacrylate, which has an index of refraction ($N_D$) of approximately 1.506, a color nu value or dispersion (V) of approximately 57, a coefficient of linear expansion of $7.6 \times 10^{-5}$, a rate of change in index of refraction of −0.000131 per degree C for the sodium D line and in the illustrated system lenses II, IV, and V are formed of this material. For the flint material styrene, which has an index of refraction ($N_D$) of approximately 1.592, a color nu value or dispersion (V) of approximately 31, a coefficient of linear expansion of $7.1 \times 10^{-5}$, and a rate of change in index of refraction of −0.000136 per degree C for the sodium D line, may be employed, and lens III is formed of this material.

Lens I has a power equal to approximately ⅘ that of the system and, accordingly, provides approximately 80% athermalization for focal point of plastic lenses II to V, the system being designed for a housing which is adapted to provide the additional 20% athermalization necessary to achieve substantially complete athermalization for focal point.

In Fig. 2 there is illustrated a photographic objective comprising six lens components, $I_A$, $II_A$, $III_A$, $IV_A$, $V_A$, and $VI_A$ wherein the foremost lens $I_A$ is formed of an optical glass, such as dense barium crown, lenses $II_A$, $IV_A$, $V_A$, and $VI_A$ are formed of cyclohexyl methacrylate and lens $III_A$ is formed of styrene. In this system lens $I_A$ has a power equal to approximately that of the system, i. e., 98% of the power of the system, so that lenses $II_A$ to $VI_A$ are substantially entirely athermalized for focal point by said glass lens.

Although styrene and cyclohexyl methacrylate are preferred, it is to be understood that the plastic lenses may be formed of any resins which are sufficiently transparent, homogeneous and hard, to be used optically, and preferably those which may be accurately cast by polymerization in molds. Examples of further resins of this character are methyl methacrylate, benzyl methacrylate, phenyl methacrylate, and ortho-chlorostyrene. The vinyl compounds, such as styrene, orthochlorostyrene, and other members of the styrene family and esters of acrylic and alpha-substituted acrylic acids, and particularly of methacrylic acid, provide polymerizable materials best suited for forming the plastic lenses.

In each of the tables below relating to the illustrated lens systems, the column "Radius" refers to the radii of the spherical surfaces as measured in the same linear units as used to measure the focal length of the system illustrated, as for example, millimeters. The column designated "Thickness" refers to the thickness of the lenses, also the air gaps between lenses as measured on the axis of the lens system in the same linear units as those used to measure the "Radius." The letter "t" indicates lens thickness and the letter "d" air spaces, $d_{10}$ in the first table being the distance from $R_9$ to the focal surface, and $d_{11}$ in the second table being the distance between $R_{11}$ and the focal surface. The term "$N_D$" is used to designate the index of refraction of the materials for the lenses as measured for the yellow "D" line of a sodium arc. The column "V" designates nu value $$\frac{N_D - 1}{N_F - N_C}$$

i. e., reciprocal dispersion, for the lens materials used.

The following table sets out the constructional data for the lens system of Fig. 1:

[Focal Length = 190]

| Lens | Radius | Thickness | $N_D$ | V |
|---|---|---|---|---|
| I | $R_1=+120.1$<br>$R_2=-1,848.5$ | $t_1=13.8$<br>$d_2=0$ | 1.523 | 57 |
| II | $R_3=+75.2$<br>$R_4=+44.7$ | $t_3=35.0$<br>$d_4=15.8$ | 1.506 | 57 |
| III | $R_5=-67.3$<br>$R_6=+71.1$ | $t_5=4.5$ | 1.592 | 31 |
| IV | $R_6=+71.1$<br>$R_7=-107.4$ | $t_7=46.2$<br>$d_8=0.0$ | 1.506 | 57 |
| V | $R_8=+218.8$<br>$R_9=-114.0$ | $t_9=19.2$<br>$d_{10}=140.7$ | 1.506 | 57 |

The above photographic objective has an f/4.5 aperture and is well corrected over a 40 degree total field.

The following table sets out the constructional data for the photographic objective of Fig. 2:

[Focal Length = 100]

| Lens | Radius | Thickness | $N_D$ | V |
|---|---|---|---|---|
| IA | $R_1=+48.24$<br>$R_2=+452.49$ | $t_1=7.6$<br>$d_2=0$ | 1.611 | 58.8 |
| IIA | $R_3=+33.55$<br>$R_4=-153.84$ | $t_3=14.8$ | 1.506 | 57 |
| IIIA | $R_4=-153.84$<br>$R_5=+27.85$ | $t_4=1.8$<br>$d_5=4.6$ | 1.591 | 31 |
| IVA | $R_6=-66.22$<br>$R_7=+46.30$ | $t_6=1.8$<br>$d_7=6.95$ | 1.506 | 57 |
| VA | $R_8=+169.49$<br>$R_9=-106.38$ | $t_8=5.0$<br>$d_9=0$ | 1.506 | 57 |
| VIA | $R_{10}=+88.88$<br>$R_{11}=-74.07$ | $t_{10}=6.0$<br>$d_{11}=66.1$ | 1.506 | 57 |

The above photographic objective has an f/3 aperture and is well corrected over a 35 degree total field.

There is thus provided a novel system comprising a plurality of lens elements of organic resin or plastic and one or more athermalizing lens elements of glass, said elements being arranged in a novel manner to effect a predetermined degree of athermalization for the system. A novel method is provided for selecting athermalization elements whereby the sum of their convergence factors bears a predetermined relationed relation to the power of the system in accordance with the degree of athermalization for focal point for the plastic lenses which is desired.

Although the invention is primarily directed to the athermalization of lens systems of plastic, it is not limited thereto and is applicable to any lens system comprising a plurality of components having coefficients of thermal expansion of such magnitude that changes in temperature will produce an appreciable variation in the back focal length. To athermalize a system in accordance with the invention, the lens element or elements which are used to athermalize need only have negligible thermal expansion and have their optical properties substantially unaffected by changes in temperature within ordinary limits.

In the claims the term "convergence factor" of a lens is to be understood to mean the product of the position factor $(1-C)^2$ and the power of that lens, where C is the fractional convergence of a paraxial ray incident on said lens.

Since certain changes in carrying out the above process and in the constructions set forth which embody the invention may be made without departing from its scope, it is intended that all matter contained in the above description, or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of forming an athermalized lens system, comprising, providing a lens element of material negligibly subject to thermal effects and having a predetermined index of refraction, dispersion and a power which is related to the power of the system as a whole, optically correcting said element negligibly subject to thermal effects for at least one aberration with a plurality of components appreciably subject to thermal effects each selected to have approximately equal thermal nu values and a predetermined index of refraction, dispersion and a power related to the power of the system as a whole, and arranging said components appreciably subject to thermal effects and said element negligibly subject to thermal effects in axial alignment at spacings which satisfy the condition that the sum of the convergence factors of said components appreciably subject to thermal effects approximately equals zero while the convergence factor for said element negligibly subject to thermal effect approximates the power of the system.

2. A method of forming an athermalized lens system, comprising, providing a plurality of lens elements of material negligibly subject to thermal effects and each having a predetermined index of refraction, dispersion and a power which is related to the power of the system as a whole, optically correcting said elements negligibly subject to thermal effects for at least one aberration with a plurality of components appreciably subject to thermal effects each selected to have approximately equal thermal nu values and a predetermined index of refraction, dispersion and a power related to the power of the system as a whole, and arranging said components appreciably subject to thermal effects and said elements negligibly subject to thermal effects in axial alignment at spacings which satisfy the condition that the sum of the convergence factors of said components appreciably subject to thermal effects approximately equals zero while the convergence factor summation for said elements negligibly subject to thermal effects approximates the power of the system.

3. A method of forming a lens system having N percentage of athermalization for focal point, comprising, providing at least one lens element of material negligibly subject to thermal effects and having a predetermined index of refraction, dispersion and a power which is related to the power of the system as a whole, optically correcting all such elements negligibly subject to thermal effects for at least one aberration with a plurality of components appreciably subject to thermal effects each selected to have approximately equal thermal nu values and a predetermined index of refraction, dispersion and a power related to the power of the system as a whole, and arranging said components appreciably subject to thermal effects and all such elements negligibly subject to thermal effects in axial alignment at spacings which satisfy the condition that the convergence factor summation for all such elements negligibly subject to thermal effects approximates the power of the system multiplied by N/100.

4. A method of forming an athermalized lens system, comprising, providing a lens element of glass having a predetermined index of refraction, dispersion and a power which is related to the power of the system as a whole, said glass lens element being negligibly subject to thermal effects, optically correcting said glass element for at least one aberration with a plurality of lens components of plastic appreciably subject to thermal effects, each plastic element being selected to have an approximately equal thermal nu value and a predetermined index of refraction, dispersion and a power related to the power of the system as a whole, and arranging said plastic components and said glass element in axial alignment at spacings which satisfy the condition that the sum of the convergence factors of the plastic components approximately equals zero while the convergence factor for said glass element approximates the power of the system.

5. A method of forming an athermalized lens system, comprising, providing a plurality of lens elements of glass each having a predetermined index of refraction, dispersion and a power which is related to the power of the system as a whole, said glass lens elements being negligibly subject to thermal effects, optically correcting said glass elements for at least one aberration with a plurality of lens components of plastic appreciably subject to thermal effects, and each selected to have an approximately equal thermal nu value and a predetermined index of refraction, dispersion and a power related to the power of the system as a whole, and arranging said plastic components and said glass elements in axial alignment at spacings which satisfy the condition that the sum of the convergence factors of the plastic components approximately equals zero while the convergence factor summation for said glass elements approximates the power of the system.

6. A method of forming a lens system having N percentage of athermalization for focal point, comprising, providing at least one lens element of glass having a predetermined index of refraction, dispersion and a power which is related to the power of the system as a whole, each such glass element being negligibly subject to thermal effects, optically correcting all such glass elements for at least one aberration with a plurality of plastic lens components appreciably subject to thermal effects and each selected to have an approximately equal thermal nu value and a predetermined index of refraction, dispersion and a power related to the power of the system as a whole, and arranging said plastic lens components and said glass lens elements in axial alignment at spacings which satisfy the condition that the convergence factor summation for all such glass lens elements approximates the power of the system multiplied by N/100.

7. A lens system predeterminedly athermalized for focal point, comprising, a lens element of glass having a predetermined index of refraction, dispersion and a power which is related to the power of the system as a whole, and at least one lens of plastic which optically corrects the system for at least one aberration and which has a predetermined index of refraction, dispersion and a power related to the power of the system as a whole, all such plastic lenses having approximately equal thermal nu values, and said lenses being arranged in axial alignment at spacings with respect to each other to satisfy the condition that the product of the power of said glass lens and its position factor forms a ratio with the power of the system which is directly proportional to the degree of athermalization for focal point desired for the system.

8. A lens system predeterminedly athermalized for focal point, comprising, at least one lens element of glass of a predetermined index of refraction and dispersion and a power which is related to the power of the system as a whole and a plurality of lens components of plastic optically correcting the system for at least one aberration and having predetermined indices of refraction, dispersion and individual powers related to the power of the system as a whole, all such plastic components having approximately equal thermal nu values, and said elements and components being arranged in axial alignment at a spacing with respect to each other to satisfy the condition that the sum of the products obtained by multiplying each such glass element by its position factor forms a ratio with the power of the system which is directly proportional to the degree of athermalization for focal point desired for said system.

9. A lens system athermalized for focal point, comprising, at least one lens element of material negligibly subject to thermal effects and having a predetermined index of refraction, dispersion and a power which is related to the power of the system as a whole, and at least one lens component of a material appreciably subject to thermal effects which optically corrects the system for at least one aberration and has a predetermined index of refraction, dispersion and a power related to the power of the system as a whole, all such lens components appreciably subject to thermal effects having approximately equal thermal nu values, said lenses being arranged in axial alignment at spacings with respect to each other to satisfy the condition that the sum of the convergence factors of all such lenses negligibly subject to thermal effects approximates the power of said system.

10. A lens system having N percentage athermalization for focal point, comprising, a foremost lens of glass having a predetermined index of refraction, dispersion and a power of approximately N/100 times the power of the system, and a plurality of plastic lenses optically correcting the glass element for at least one aberration and each having approximately equal thermal nu values and a predetermined index of refraction, dispersion, and a power related to the power of the system as a whole, said plastic lenses being axially aligned with said foremost glass lens at spacings which satisfy the condition that the sum of the convergence factors of the plastic lenses approximates the product of $$\frac{1-N}{100}$$

and the power of the system,

11. An athermalized optical system, comprising, a foremost lens element of glass which has a predetermined index of refraction and a predetermined dispersion and which substantially provides the power of the system, and a plurality of components of plastic which optically correct the glass element for at least one aberration, said plastic components having approximately similar thermal nu values and each of said components having a predetermined index of refraction, dispersion and a power which is related to the power of the system as a whole, and said glass element and said plastic components being axially aligned at spacings such that the sum of the convergence factors of said plastic components is approximately zero while the convergence factor for said glass element approximates the power of the system.

12. A partially athermalized lens system having lens means comprising at least one glass lens of predetermined index of refraction, dispersion and a power related to the power of the system as a whole, and a plurality of plastic lenses N% athermalized for focal point by such glass lens means and optically correcting the glass lens means, said plastic lenses having approximately equal thermal nu values and each having a predetermined index of refraction, dispersion and a power related to the power of the system as a whole, all said lenses being arranged in axial alignment at spacings such that the sum of the convergence factors of the plastic lenses is approximately equal to $$\left(\frac{100-N}{100}\right)\%$$

of the power of the system.

13. In a lens system having a plurality of glass and plastic lenses mounted in a housing which provides N% athermalization for the focal point of the system, in combination, at least one lens of glass having a predetermined index of refraction, dispersion and a power related to the power of the system as a whole, and a plurality of plastic lenses each having an approximately similar thermal nu value and a predetermined index of refraction, a dispersion and a power related to the power of the system as a whole, said glass and plastic lenses being axially aligned and mounted within the housing to have the convergence factor summation for all such glass lenses approximately equal to $$\frac{100-N}{100}$$

times the power of the system whereby to athermalize the system by $(100-N)\%$.

14. A method of athermalizing for focal point a lens system having at least one lens element of glass of predetermined index of refraction, dispersion and a power related to the power of the system as a whole and a plurality of lens components of plastic which optically correct each such glass lens element and which each have approximately similar thermal nu values and a predetermined index of refraction, dispersion and a power related to the system as a whole, comprising, arranging each said glass lens element and plastic lens components in axial alignment with each other at spacings to satisfy the condition that the sum of the products obtained by multiplying the power of each said glass element by its position factor equals approximately the power of the system multiplied by $$\left(\frac{100-N}{100}\right)\%$$

while mounting said components in a housing of a character which provides the system with N% athermalization for focal point.

DAVID S. GREY.

Certificate of Correction

Patent No. 2,406,762 — September 3, 1946

DAVID S. GREY

It is hereby certified that errors appear in the printed specification of the above numbered patent requiring correction as follows:

Column 5, lines 60 and 61, strike out "relationed"; column 6, line 43, for the word "effect" read *effects*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*